(12) United States Patent
Chae et al.

(10) Patent No.: US 12,205,212 B2
(45) Date of Patent: Jan. 21, 2025

(54) METHOD AND DEVICE FOR GENERATING SPEECH MOVING IMAGE

(71) Applicant: DEEPBRAIN AI INC., Seoul (KR)

(72) Inventors: Gyeongsu Chae, Seoul (KR); Guembuel Hwang, Seoul (KR)

(73) Assignee: DEEPBRAIN AI INC., Seoul (KR)

( * ) Notice: Subject to any disclaimer, the term of this patent is extended or adjusted under 35 U.S.C. 154(b) by 358 days.

(21) Appl. No.: 17/762,914

(22) PCT Filed: Dec. 8, 2020

(86) PCT No.: PCT/KR2020/017847
§ 371 (c)(1),
(2) Date: Mar. 23, 2022

(87) PCT Pub. No.: WO2022/014800
PCT Pub. Date: Jan. 20, 2022

(65) Prior Publication Data
US 2022/0398793 A1 Dec. 15, 2022

(30) Foreign Application Priority Data
Jul. 13, 2020 (KR) .................. 10-2020-0086183

(51) Int. Cl.
*G06T 13/00* (2011.01)
*G06T 9/00* (2006.01)
(Continued)

(52) U.S. Cl.
CPC ............ *G06T 13/00* (2013.01); *G06T 9/00* (2013.01); *G10L 15/02* (2013.01); *G10L 21/055* (2013.01); *G10L 25/30* (2013.01)

(58) Field of Classification Search
None
See application file for complete search history.

(56) References Cited

U.S. PATENT DOCUMENTS

| | | | |
|---|---|---|---|
| 6,219,640 B1* | 4/2001 | Basu | G06V 40/16 704/231 |
| 2007/0009180 A1* | 1/2007 | Huang | G06T 17/20 704/E21.02 |

(Continued)

FOREIGN PATENT DOCUMENTS

| | | |
|---|---|---|
| JP | 2007-288370 A | 11/2007 |
| KR | 10-2001-0039771 A | 5/2001 |

(Continued)

OTHER PUBLICATIONS

Kim et al., "Method and Apparatus for Translating Speech of Video and Providing Lip-Synchronization for Translated Speech in Video" (English Translation), originally published in Korean in 2019, machine translated on May 2, 2024, Espacenet, pp. 1-18 (Year: 2024).*

(Continued)

*Primary Examiner* — Kent W Chang
*Assistant Examiner* — Jonathan M Cofino
(74) *Attorney, Agent, or Firm* — The PL Law Group, PLLC

(57) ABSTRACT

A device which generates a speech moving image includes a first encoder, a second encoder, a combination unit, and an image reconstruction unit. The first encoder receives a person background image in which a portion related to speech of a person that is a video part of the speech moving image of the person is covered with a mask, extracts an image feature vector from the person background image, and compresses the extracted image feature vector. The second encoder receives a speech audio signal that is an audio part of the speech moving image, extracts a voice feature vector from the speech audio signal, and compresses the extracted voice feature vector. The combination unit generates a combination vector of the compressed image feature vector and the compressed voice feature vector. The image recon- (Continued)

struction unit reconstructs the speech moving image of the person with the combination as an input.

11 Claims, 4 Drawing Sheets

(51) Int. Cl.
    *G10L 15/02*     (2006.01)
    *G10L 21/055*     (2013.01)
    *G10L 25/30*     (2013.01)

(56) References Cited

U.S. PATENT DOCUMENTS

2009/0300055 A1* 12/2009 Mestha ............... G06F 16/5838
                                                    707/999.102
2021/0350135 A1* 11/2021 Salamon ................ H04S 7/302

FOREIGN PATENT DOCUMENTS

| KR | 10-2006-0090687 A | 8/2006 |
| KR | 10-2019-0114150 A | 10/2019 |
| KR | 10-2020-0056342 A | 5/2020 |

OTHER PUBLICATIONS

International Search Report for PCT/KR2020/017847 mailed on Jul. 27, 2021.

\* cited by examiner

METHOD AND DEVICE FOR GENERATING SPEECH MOVING IMAGE

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2020/017847, filed Dec. 8, 2020, which claims priority to the benefit of Korean Patent Application No. 10-2020-0086183 filed in the Korean Intellectual Property Office on Jul. 13, 2020, the entire contents of which are incorporated herein by reference.

BACKGROUND

1. Technical Field

Embodiments of the present disclosure relate to a technology of generating a speech moving image based on machine learning.

2. Background Art

With recent technological development in the artificial intelligence field, various types of contents are being generated based on artificial intelligence technology. For example, there is a case in which, when there is a voice message to be transmitted, a speech moving image is generated as if a famous person (for example, a president) speaks the voice message in order to draw people's attention. This is achieved by generating mouth shapes or the like to fit a specific message, just like a famous person speaking the specific message in an image of the famous person.

For this purpose, in the related art, a method is used in which a landmark or key point related to voice is first generated from an existing speech image, learning about the landmark or key point is performed, and then an image that matches the input voice is synthesized using a trained model. However, in the related art, processes of extracting a key point for learning, transforming the key point into a standard space (a position facing the front from the center of a screen), and performing inverse transformation is inevitably required, and steps of synthesizing a key point and synthesizing an image are necessary, which may lead to a problem of complicating the procedure.

Meanwhile, in the case of the method that does not use the key point, a method in which only the face portion is cut off, alignment is made according to the size and position, and then an image matching the input voice is synthesized is used, which may be unlikely to reflect the natural movement of the person, thereby leading to a problem of unnatural results.

SUMMARY

Disclosed embodiments are to provide a method and device for generating a speech moving image capable of reflecting a motion or gesture occurring during a speech.

Further, disclosed embodiments are to provide a method and device for generating a speech moving image capable of simplifying the structure of a neural network.

Further, disclosed embodiments are to provide a method and device for generating a speech moving image capable of preventing degradation of speech moving image quality even if mask processing is not properly performed on a person background image.

A device for generating a speech moving image according to an embodiment disclosed herein is a computing device including one or more processors and a memory storing one or more programs executed by the one or more processors, and the device includes: a first encoder that receives a person background image in which a portion related to speech of a person that is a video part of the speech moving image of the person is covered with a mask, extracts an image feature vector from the person background image, and compresses the extracted image feature vector; a second encoder that receives a speech audio signal that is an audio part of the speech moving image, extracts a voice feature vector from the speech audio signal, and compresses the extracted voice feature vector; a combination unit that generates a combination vector by combining the compressed image feature vector output from the first encoder and the compressed voice feature vector output from the second encoder; and an image reconstruction unit that reconstructs the speech moving image of the person with the combination vector as an input.

The first encoder and the second encoder may respectively compress the image feature vector and the voice feature vector at different compression rates.

The person background image and the speech audio signal may be synchronized with each other in time and have the same time section in the speech moving image of the person.

The first encoder may include a first feature extraction unit that extracts the image feature vector from the person background image and a first compression unit that compresses the extracted image feature vector, the second encoder may include a second feature extraction unit that extracts the voice feature vector from the speech audio signal and a second compression unit that compresses the extracted voice feature vector, and a compression rate of the first compression unit may be provided to be higher than a compression rate of the second compression unit.

A length of the image feature vector compressed by the first compression unit may be provided to be shorter than a length of the voice feature vector compressed by the second compression unit.

The first compression unit may calculate a representative value of an image feature vector for each channel based on the extracted image feature vector, calculates an image representative feature matrix using the representative value of the image feature vector for each channel as each matrix element, and control a compressed size of the image feature vector by connecting a fully connected neural network to the image representative feature matrix.

The representative value may be a mean value of the image feature vector for each channel, and the first compression unit may calculate the mean value of the image feature vector for each channel through Equation 1 below.

$$f_c = \frac{1}{HW}\sum_{i=1}^{H}\sum_{j=1}^{W} F_{i,j,c} \qquad \text{(Equation 1)}$$

$f_c$: Mean value of an image feature vector of a c-th channel
H: Height of the image feature vector
W: Width of the image feature vector
$F_{i,j,c}$: Image feature vector value of the c-th channel at (i, j) coordinates
The first compression unit
may calculate the image representative feature matrix through Equation 2 below.

$$f_b = [f_0, \ldots, f_c, \ldots, f_K]^T \qquad \text{(Equation 2)}$$

$f_b$: Image representative feature matrix
K: Number of channels of the image feature vector
T: Transpose matrix The compressed image feature vector output from the first compression unit may be expressed by Equation 3 below.

$$Z_b = \sigma(W_b f_b + b_b) \quad \text{(Equation 3)}$$

$z_b$: Compressed image feature vector
σ: Activation function of the fully connected neural network
$W_b$, $b_b$: Parameters of the fully connected neural network The second compression unit may calculate a voice representative feature vector by compressing the extracted voice feature vector on a time axis, and control a compressed size of the voice feature vector by connecting the fully connected neural network to the voice representative feature vector.

The second compression unit may calculate the voice representative feature vector through Equation 4 below.

$$f_a = \frac{1}{L}\sum_{l=1}^{L} F_l \quad \text{(Equation 4)}$$

$f_a$: Voice representative feature vector
L: Number of consecutive voice feature vectors on the time axis during a reference time
$F_l$: l-th voice feature vector The compressed voice feature vector output from the second compression unit may be expressed by Equation 5 below.

$$Z_a = \sigma(W_a f_a + b_a) \quad \text{(Equation 5)}$$

$z_a$: Compressed voice feature vector
σ: Activation function of the fully connected neural network
$W_a$, $b_a$: Parameters of the fully connected neural network A method for generating a speech moving image according to an embodiment disclosed herein is a method executed by a computing device including one or more processors and a memory storing one or more programs executed by the one or more processors, and the method includes: receiving, in a first encoder, a person background image in which a portion related to speech of a person that is a video part of the speech moving image of the person is covered with a mask to extract an image feature vector from the person background image and compress the extracted image feature vector; receiving, in a second encoder, a speech audio signal that is an audio part of the speech moving image to extract a voice feature vector from the speech audio signal, and compress the extracted voice feature vector; generating, in a combination unit, a combination vector by combining the compressed image feature vector output from the first encoder and the compressed voice feature vector output from the second encoder; and reconstructing, in an image reconstruction unit, the speech moving image of the person with the combination vector as an input.

According to the disclosed embodiments, learning is performed with the person background image including the face and the upper body as an input, in a state in which the portion related to speech is masked, and thus it is possible to generate a speech moving image by reflecting a person's unique gesture or feature appearing during speech of the person, such as the movements of the face, the neck, the shoulder, or the like, thereby making it possible to generate a more natural speech moving image.

In addition, a video part of the speech moving image is input to the first encoder, an audio part thereof is input to the second encoder, and the masked portion related to speech is reconstructed from the audio, and thus it is possible to generate a speech moving image through a single neural network model without a separate key point prediction process.

In addition, a speech moving image is generated that includes not only the face but also the upper body, and thus it is possible to naturally paste the other body parts (for example, torso, arms and legs, or the like) of the person without an additional transformation or synthesis process.

In addition, the compression rate is adjusted such that the length of the image feature vector output from the first encoder is smaller than the length of the voice feature vector output from the second encoder, and thus it is possible to induce the speech audio signal to lead the information on the portion related to speech, thereby making it possible to prevent the quality of the speech moving image from being degraded even if masking is not properly performed in the person background image.

DETAILED DESCRIPTION

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice or the intention of a user or operator. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

In the following description, the terminology "transmission", "communication", "reception" of a signal or information and terminology similar thereto may include a meaning in which the signal or information is directly transmitted from one element to another element and transmitted from one element to another element through an intervening element. In particular, "transmission" or "sending" of the signal or information to one element may indicate a final destination of the signal or information and may not imply a direct destination. The same is true for "reception" of the signal or information. In addition, in the present specification, a meaning in which two or more pieces of data or information are "related" indicates that when any one piece of data (or information) is obtained, at least a portion of other data (or information) may be obtained based thereon.

Further, it will be understood that, although the terms first, second, etc. may be used herein to describe various elements, these elements should not be limited by these terms. These terms may be used to distinguish one element from another element. For example, without departing from the scope of the present disclosure, a first element could be termed a second element, and similarly, a second element could be termed a first element.

Figure 1:
FIG. 1 is a block diagram showing a configuration of a device for generating a speech moving image according to an embodiment of the present disclosure.

FIG. 1 is a block diagram showing a configuration of a device for generating a speech moving image according to an embodiment of the present disclosure. Referring to FIG. 1, the device for generating a speech moving image (speech moving image generation device) 100 may include a first encoder 102, a second encoder 104, a combination unit 106, and a decoder 108.

The components of the speech moving image generation device 100 shown in FIG. 1 represents functionally distinct functional elements, and may be functionally connected to each other in order to perform a function according to the present disclosure, and any one or more components may actually be implemented as being physically integrated with each other.

In an exemplary embodiment, the speech moving image generation device 100 may be built with a machine learning technology based on a convolutional neural network (CNN); however, the machine learning technology is not limited thereto, and various other machine learning techniques may be applied. Hereinafter, a learning process for generating a speech moving image will be mainly described.

The first encoder 102 may be a machine learning model that is trained to extract image feature vectors with a person background image as an input. Hereinafter, "vector" may be used to include "tensor".

Here, the person background image input to the first encoder 102 is an image in which the person is speaking (uttering). The person background image may be an image including the face and upper body of a person. That is, the person background image may be an image including not only the face but also the upper body so that movements of the face, neck, shoulders, or the like, appearing when the person is speaking are shown.

In the person background image input to the first encoder 102, a portion related to speech may be masked. That is, the portion related to speech (e.g., a mouth and a portion around the mouth) in the person background image may be covered with a mask M. In addition, during the masking process, portions related to a face movement, a neck movement, a shoulder movement, or the like, accompanied by the speech of the person may not be masked in the person background image. Then, the first encoder 102 extracts an image feature vector of a portion excluding the portion related to speech from the person background image.

The first encoder 102 may include one or more convolutional layers and one or more pooling layers. The convolution layer may extract feature values of pixels corresponding to a filter having a preset size (e.g., pixel size of 3×3) while moving the filter from the input person background image at regular intervals. The pooling layer may perform down sampling by receiving the output of the convolution layer as an input.

The second encoder 104 is a machine learning model trained to extract a voice feature vector with a speech audio signal as an input. Here, the speech audio signal corresponds to an audio part of a person background image (that is, an image in which a person is speaking) input to the first encoder 102. In other words, in a moving image in which a person is speaking, a video part may be input to the first encoder 102, and an audio part may be input to the second encoder 104. The second encoder 104 may include one or more convolutional layers and one or more pooling layers; however, the structure of the neural network of the second encoder 104 is not limited thereto.

The time of the person background image input to the first encoder 102 and the time of the speech audio signal input to the second encoder 104 may be synchronized with each other. That is, in the moving image in which a person is speaking, a video may be input to the first encoder 102 and an audio may be input to the second encoder 104 in an interval of the same time slot. In this case, the person background image and the speech audio signal may be input to the first encoder 102 and the second encoder 104 every preset unit time (e.g., one frame or a plurality of consecutive frames, or the like).

The combination unit 106 may generate a combination vector by combining the image feature vector output from the first encoder 102 and the voice feature vector output from the second encoder 104. In an exemplary embodiment, the combination unit 106 may generate a combination vector by concatenating the image feature vector and the voice feature vector, but is not limited thereto.

The decoder 108 may reconstruct a speech moving image of the person with the combination vector output from the combination unit 106 as an input. Specifically, the decoder 108 may be a machine learning model trained to reconstruct a portion (that is, portion related to the speech) covered with the mask M of the image feature vector (that is, a video part in the moving image in which the person is speaking, which indicates the feature of the portion related to speech covered with the mask) output from the first encoder 102 based on the voice feature vector (that is, the feature of the audio part of the moving image in which the person is speaking) output from the second encoder 104. That is, the decoder 108 may be a model trained to reconstruct a masked region using the audio signal when a portion related to speech is masked in the person background image.

In an exemplary embodiment, the decoder 108 may generate a speech moving image by performing inverse convolution on a combination vector in which the image feature vector output from the first encoder 102 and the voice feature vector output from the second encoder 104 are combined, and then performing up-sampling.

The decoder 108 may compare the generated speech moving image with the original speech moving image (that is, the correct value), and adjust learning parameters (for example, a loss function, softmax function, or the like) such that the generated speech moving image (that is, the moving image in which the portion related to speech is reconstructed through the audio part) is close to the original speech moving image.

Figure 2:
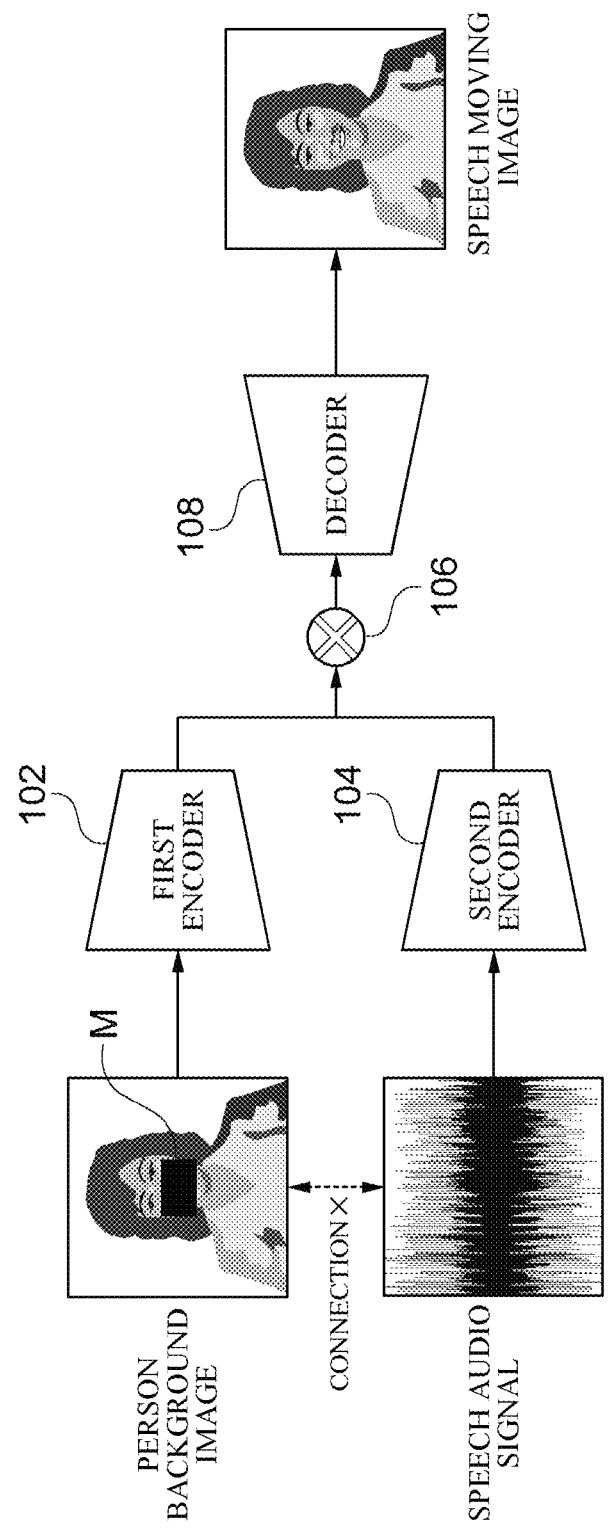
FIG. 2 is a view showing a state in which a speech moving image is inferred through the device for generating a speech moving image according to an embodiment of the present disclosure.

FIG. 2 is a view showing a state in which a speech moving image is inferred through the speech moving image generation device according to an embodiment of the present disclosure.

Referring to FIG. 2, the first encoder 102 receives a person background image. Here, the person background image may be a person background image used in a learning process. The person background image may be an image including the face and upper body of a person. In addition, in the person background image, a portion related to speech may be covered with the mask M. The first encoder 102 may extract an image feature vector from the person background image.

The second encoder 104 receives a speech audio signal. Here, the speech audio signal may be unrelated to the person background image input to the first encoder 102. For example, the speech audio signal may be a speech audio signal of a person different from the person in the person background image. However, the speech audio signal is not limited thereto, and may be spoken by a person in the person background image. In this case, the speech of the person may be given in a background or situation unrelated to the person background image. The second encoder 104 may extract a voice feature vector from the speech audio signal.

The combination unit 106 may generate a combination vector by combining the image feature vector output from the first encoder 102 and the voice feature vector output from the second encoder 104.

The decoder 108 may reconstruct and output the speech moving image with the combination vector as an input. That is, the decoder 108 may generate the speech moving image by reconstructing the portion related to speech of the person background image based on the voice feature vector output from the second encoder 104. In this case, the speech audio signal input to the second encoder 104 is a speech that is unrelated to the person background image (for example, it is not the speech of the person in the person background image), but the speech moving image is generated as if the person in the person background image is speaking.

According to the disclosed embodiments, learning is performed with the person background image including the face and the upper body as an input, in a state in which the portion related to speech is masked, and thus it is possible to generate a speech moving image by reflecting a person's unique gesture or feature appearing during speech of the person, such as the movements of the face, the neck, the shoulder, or the like, thereby making it possible to generate a more natural speech moving image.

In addition, the video part of the speech moving image is input to the first encoder 102, the audio part thereof is input to the second encoder 104, and the masked portion related to speech is reconstructed from the audio, and thus it is possible to generate a speech moving image through a single neural network model without a separate key point prediction process.

In addition, a speech moving image is generated that includes not only the face but also the upper body, and thus it is possible to naturally paste the other body parts (for example, torso, arms and legs, or the like) of the person without an additional transformation or synthesis process.

Meanwhile, in the person background image, while removing the portion related to speech of the person as much as possible, information about the position and movement of the upper body of the person has to be preserved as much as possible. When the portion related to speech of the person is not properly covered with the mask M in the person background image, there is a risk that the person background image will control the speech-related part in the speech moving image generated by the decoder 108.

On the other hand, when more than the portion related to speech of the person is made masked with the mask M in the person background image, information such as the position and movement of the upper body of the person is reduced in the person background image, which may lead to quality degradation of the speech moving image generated by the decoder 108.

Therefore, in the following, a method will be described that is capable of controlling the covering through the neural network in a speech moving image generation device 100, even if the portion related to speech is not properly covered with the mask M in the person background image.

That is, in person background image, it is possible to induce removal of trivial information related to speech by increasing a compression rate in a process of encoding the person background image, even if the mask M fails to properly mask the portion related to speech of the person and some of the portion related to speech remains uncovered. For example, the wrinkles under the eyes move slightly when a person is speaking, and when this portion is not covered with the mask M in the person background image and some of the portion related to speech remains uncovered, removal of the portion under the eyes may be induced during the encoding process by increasing the compression rate when the person background image is encoded, since information on the portion contains relatively little data.

Here, since the decoder 108 generates a speech moving image based on a combination vector in which the image feature vector of the first encoder 102 and the voice feature vector of the second encoder 104 are combined, the speech audio signal may lead information on the portion related to speech by increasing the compression rate of the first encoder 102 to make the size of the image feature vector relatively small and lowering the compression rate of the second encoder 104 to make the size of the voice feature vector relatively large. In this way, it is possible to prevent the quality of the speech moving image from being degraded even if masking is not properly performed in the person background image.

Figure 3:
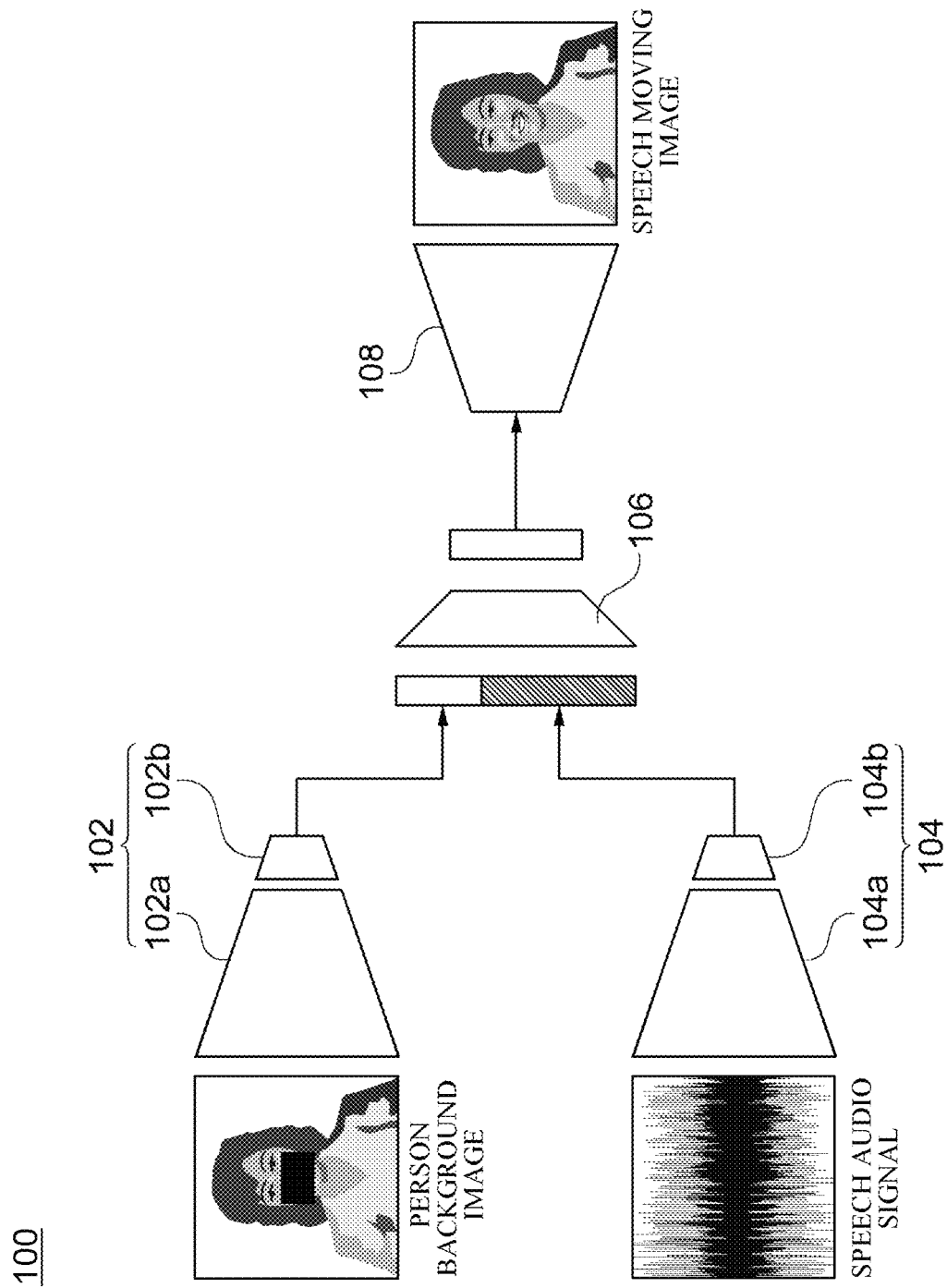
FIG. 3 is a block diagram showing a configuration of a device for generating a speech moving image according to another embodiment of the present disclosure.

FIG. 3 is a block diagram showing a configuration of a device for generating a speech moving image according to another embodiment of the present disclosure. Here, a configuration for compressing the person background image and the speech audio signal in the device for generating a speech moving image shown in FIG. 1 is illustrated in more detail.

Referring to FIG. 3, the device for generating a speech moving image (speech moving image generation device) 100 may include the first encoder 102, the second encoder 104, the combination unit 106, and the image reconstruction unit 108.

The first encoder 102 may include a first feature extraction unit 102a and a first compression unit 102b. The first feature extraction unit 102a may extract an image feature vector from the input person background image. In an exemplary embodiment, the first feature extraction unit 102a may use a plurality of two-dimensional convolutional neural network layers, and may extract an image feature vector down-sampled through convolution methods such as stride and dilation. The image feature vector extracted by the first feature extraction unit 102a has a tensor form of (Height, Width, Channel), but will be referred to as an image feature vector for convenience of description.

The first compression unit 102b may compress the image feature vector extracted by the first feature extraction unit 102a. In an exemplary embodiment, the first compression unit 102b may spatially compress the image feature vector in the form of (Height, Width, Channel) (that is, tensor form) into a vector in the form of (Height, Width). The first compression unit 102b may reduce the size of the image feature vector by applying pooling (e.g., average pooling, max pooling, or the like) to the image feature vector.

Specifically, the first compression unit 102b may calculate a representative value of the image feature vector for each channel. The representative value may include, for example, a mean value or a maximum value. In an exemplary embodiment, the first compression unit 102b may obtain a mean value of the image feature vector for each channel through Equation 1 below.

$$f_c = \frac{1}{HW}\sum_{i=1}^{H}\sum_{j=1}^{W}F_{i,j,c}$$ (Equation 1)

$f_c$: Mean value of an image feature vector of a c-th channel
H: Height of the image feature vector
W: Width of the image feature vector
$F_{i,j,c}$: Image feature vector value of the c-th channel at (i, j) coordinates Further, the first compression unit 102b may calculate an image representative feature matrix based on the representative value of the image feature vector for each channel. The first compression unit 102b may calculate the image representative feature matrix by taking the representative value of the image feature vector for each channel as each matrix element. The first compression unit 102b may obtain the image representative feature matrix through Equation 2 below.

$$f_b = [f_0, \ldots, f_c, \ldots, f_K]^T$$ (Equation 2)

$f_b$: Image representative feature matrix
K: Number of channels of the image feature vector
T: Transpose matrix The first compression unit 102b may control the compressed size of the image feature vector by connecting a fully connected neural network to the image representative feature matrix. The compressed image feature vector output from the first compression unit 102b may be expressed by Equation 3 below.

$$Z_b = \sigma(W_b f_b + b_b)$$ (Equation 3)

$z_b$: Compressed image feature vector
σ: Activation function of the fully connected neural network
$W_b, b_b$: Parameters of the fully connected neural network Here, when the length of the compressed image feature vector is N, the compression rate of the image feature vector in the first compression unit 102b (hereinafter, may be referred to as an image compression rate) may be expressed as K/N. K is the number of channels of the image feature vector. In addition, for the activation function σ, for example, a nonlinear function such as Sigmoid, Tan h, and Relu may be used. In addition, the parameter $W_b$ may be $W_b \in \mathbf{R}^{N \times K}$, and the parameter $b_b$ may be $b_b \in \mathbf{R}^N$, $\mathbf{R}$ may mean a real number.

The second encoder 104 may include a second feature extraction unit 104a and a second compression unit 104b. The second feature extraction unit 104a may extract a voice feature vector from the input speech audio signal. The voice feature vector extracted by the second feature extraction unit 104a may have the form of (Sequence_length, Channel). Here, Sequence_length may mean the number of consecutive voice feature vectors on the time axis for a preset reference time. Here, the preset reference time may mean the time of the speech audio signal required to determine the shape of the mouth accompanying the speech of the person.

The second compression unit 104b may compress the voice feature vector extracted by the second feature extraction unit 104a. In an exemplary embodiment, the second compression unit 104b compresses the voice feature vector on the (Sequence_length) axis (that is, the time axis) by applying pooling (e.g., average pooling or max pooling, etc.) to the voice feature vector, thereby making it possible to reduce the size of the voice feature vector.

Specifically, the second compression unit 104b may calculate a voice representative feature vector for the voice feature vector by compressing the voice feature vector on the time axis through Equation 4 below.

$$f_a = \frac{1}{L}\sum_{l=1}^{L}F_l$$ (Equation 4)

$f_a$: Voice representative feature vector
L: Number of consecutive voice feature vectors on the time axis during a reference time
$F_l$: l-th voice feature vector The second compression unit 104b may control the compressed size of the voice feature vector by connecting a fully connected neural network to the voice representative feature vector. The compressed voice feature vector output from the second compression unit 104b may be expressed by Equation 5 below.

$$Z_a = \sigma(W_a f_a + b_a)$$ (Equation 5)

$z_a$: Compressed voice feature vector
σ: Activation function of the fully connected neural network
$W_a, b_a$: Parameters of the fully connected neural network Here, when the length of the voice representative feature vector is K' and the length of the compressed voice feature vector is M, the compression rate of the voice feature vector in the second compression unit 104b (hereinafter, may be referred to as speech compression rate) may be expressed as K'/M. In addition, for the activation function σ, for example, a nonlinear function such as Sigmoid, Tan h, and Relu may be used. In addition, the parameter $W_a$ may be $W_a \in \mathbf{R}^{M \times K'}$, and the parameter $b_b$ may be $b_a \in \mathbf{R}^M$, $\mathbf{R}$ may mean a real number.

Meanwhile, a length N of the compressed image feature vector output from the first compression unit 102b may be provided to be shorter than a length M of the compressed voice feature vector output from the second compression unit 104b. To this end, the compression rate of the first compression unit 102b may be provided to be higher than that of the second compression unit 104b.

That is, when the person background image and the speech audio signal that have the same time section are input to the first encoder 102 and the second encoder 104, the length of the image feature vector output from the first encoder 102 is much longer than the length of the image feature vector output from the second encoder 104.

However, in a disclosed embodiment, the compression rate is adjusted such that the length N of the image feature vector output from the first encoder 102 is smaller than the length M of the voice feature vector output from the second encoder 104, and thus it is possible to induce the speech audio signal to lead the information on the portion related to speech, thereby making it possible to prevent the quality of the speech moving image from being degraded even if masking is not properly performed in the person background image.

The combination unit 106 may generate a compressed combination vector by combining the compressed image feature vector output from the first encoder 102 and the compressed voice feature vector output from the second encoder 104. In an exemplary embodiment, the combination unit 106 may generate a combination vector by concatenating the compressed image feature vector with the compressed voice feature vector, but is not limited thereto.

The image reconstruction unit 108 may reconstruct a speech moving image of the person with the compressed combination vector output from the combination unit 106 as an input. Here, since, in the compressed combination vector, the size of the image feature vector is strongly compressed to be smaller than the size of the voice feature vector, when the compressed combination vector is input to a general decoder to restore the speech moving image, the quality of the speech moving image may be degraded.

Therefore, in the disclosed embodiment, the image reconstruction unit 108 may be implemented as a generative adversarial network (StyleGAN). The generative adversarial network (StyleGAN) has a structure that injects a compressed combination vector in the process of decoding a predetermined constant value (random vector) without directly decoding the compressed combination vector, and may be used to increase the capacity of a neural network.

Figure 4:
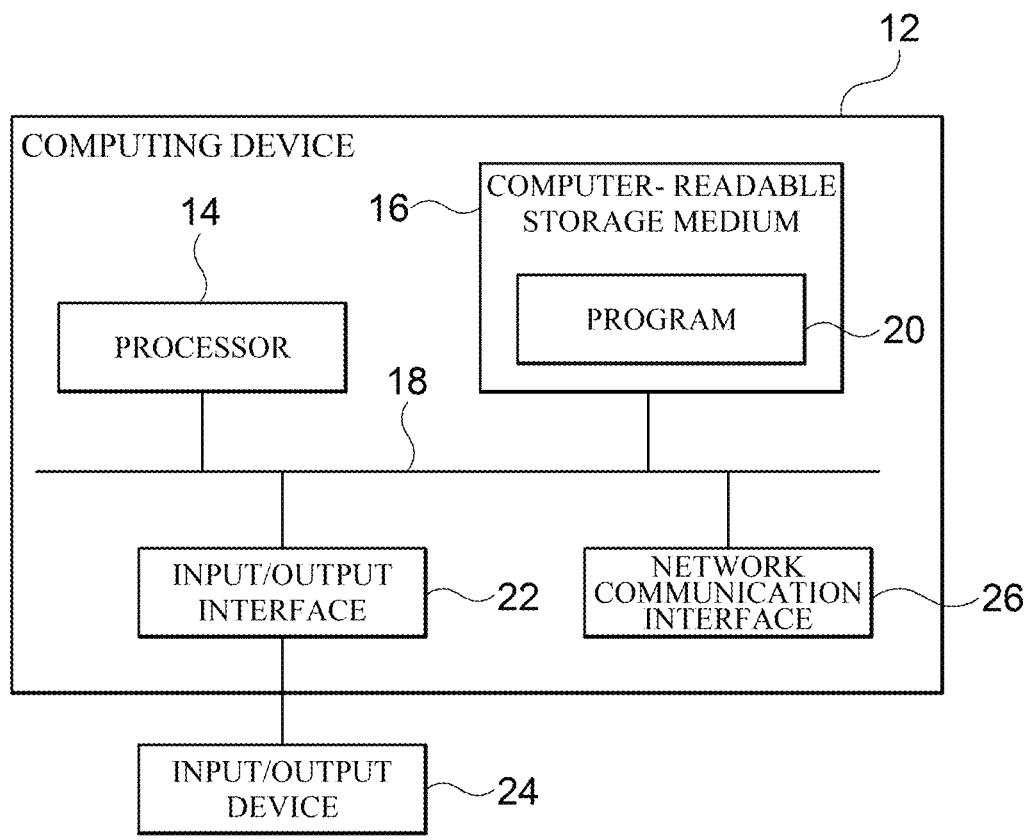
FIG. 4 is a block diagram exemplarily illustrating a computing environment that includes a computing device suitable for use in exemplary embodiments.

FIG. 4 is a block diagram exemplarily illustrating a computing environment 10 that includes a computing device suitable for use in exemplary embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the speech moving image generation device 100.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random-access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, an interlocutor, and/or a network card. The exemplary input/output device 24 may be included inside the computing device 12 as a component constituting the computing device 12, or may be connected to the computing device 12 as a separate device distinct from the computing device 12.

Although the representative embodiments of the present disclosure have been described in detail as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. A device for generating a speech moving image that is a computing device comprising one or more processors and a memory storing one or more programs executed by the one or more processors, the device comprising:
    a first encoder configured to receive a person background image in which a portion related to speech of a person that is a video part of the speech moving image of the person is covered with a mask, extract an image feature vector from the person background image, and compress the extracted image feature vector;
    a second encoder configured to receive a speech audio signal that is an audio part of the speech moving image, extract a voice feature vector from the speech audio signal, and compress the extracted voice feature vector;
    a combination unit configured to generate a combination vector by combining the compressed image feature vector output from the first encoder and the compressed voice feature vector output from the second encoder; and
    an image reconstruction unit configured to reconstruct the speech moving image of the person with the combination vector as an input,
    wherein the first encoder includes a first feature extraction unit that extracts the image feature vector from the person background image and a first compression unit that compresses the extracted image feature vector,
    wherein the first compression unit calculates a representative value of an image feature vector for each channel based on the extracted image feature vector, calculates an image representative feature matrix using the representative value of the image feature vector for each channel as each matrix element, and controls a compressed size of the image feature vector by connecting a fully connected neural network to the image representative feature matrix, and wherein the representative value is a mean value of the image feature vector for each channel; and the first compression unit calculates the mean value of the image feature vector for each channel through Equation 1 below:

$$f_c = \frac{1}{HW}\sum_{i=1}^{H}\sum_{j=1}^{W} F_{i,j,c}$$ [Equation 1]

where $f_c$: Mean value of an image feature vector of a c-th channel;

H: Height of the image feature vector;

W: Width of the image feature vector; and $F_{i,j,c}$: Image feature vector value of the c-th channel at (i, j) coordinates.

2. The device of claim 1, wherein the first encoder and the second encoder respectively compress the image feature vector and the voice feature vector at different compression rates.

3. The device of claim 1, wherein the person background image and the speech audio signal are synchronized with each other in time and have the same time section in the speech moving image of the person.

4. The device of claim 1, wherein the second encoder includes a second feature extraction unit configured to extract the voice feature vector from the speech audio signal and a second compression unit configured to compress the extracted voice feature vector; and a compression rate of the first compression unit is provided to be higher than a compression rate of the second compression unit.

5. The device of claim 4, wherein a length of the image feature vector compressed by the first compression unit is provided to be shorter than a length of the voice feature vector compressed by the second compression unit.

6. The device of claim 4, wherein the second compression unit calculates a voice representative feature vector by compressing the extracted voice feature vector on a time axis, and controls a compressed size of the voice feature vector by connecting the fully connected neural network to the voice representative feature vector.

7. The device of claim 6, wherein the second compression unit calculates the voice representative feature vector through Equation 4 below:

$$f_a = \frac{1}{L}\sum_{l=1}^{L} F_l$$ [Equation 4]

where fa: Voice representative feature vector;

L: Number of consecutive voice feature vectors on the time axis during a reference time; and Fl: l-th voice feature vector.

8. The device of claim 7, wherein the compressed voice feature vector output from the second compression unit is expressed by Equation 5 below:

$$Z_a = \sigma(W_a f_a + b_a)$$ [Equation 5]

where za: Compressed voice feature vector;

σ: Activation function of the fully connected neural network; and

Wa, ba: Parameters of the fully connected neural network.

9. The device of claim 1, wherein the first compression unit calculates the image representative feature matrix through Equation 2 below:

$$f_b = [f_0, \ldots, f_c, \ldots, f_K]^T$$ [Equation 2]

where fb: Image representative feature matrix;

K: Number of channels of the image feature vector;

T: Transpose matrix.

10. The device of claim 9, wherein the compressed image feature vector output from the first compression unit is expressed by Equation 3 below:

$$Z_b = \sigma(W_b f_b + b_b)$$ [Equation 3]

where zb: Compressed image feature vector;

σ: Activation function of the fully connected neural network; and

Wb, bb: Parameters of the fully connected neural network.

11. A method for generating a speech moving image that is executed by a computing device including one or more processors and a memory storing one or more programs executed by the one or more processors, the method comprising:

receiving, in a first encoder, a person background image in which a portion related to speech of a person that is a video part of the speech moving image of the person is covered with a mask to extract an image feature vector from the person background image and compress the extracted image feature vector;

receiving, in a second encoder, a speech audio signal that is an audio part of the speech moving image to extract a voice feature vector from the speech audio signal, and compress the extracted voice feature vector;

generating, in a combination unit, a combination vector by combining the compressed image feature vector output from the first encoder and the compressed voice feature vector output from the second encoder; and reconstructing, in an image reconstruction unit, the speech moving image of the person with the combination vector as an input, wherein the first encoder includes a first feature extraction unit that extracts the image feature vector from the person background image and a first compression unit that compresses the extracted image feature vector, and calculating, in the first compression unit, a representative value of an image feature vector for each channel based on the extracted image feature vector, wherein the representative value is a mean value of the image feature vector for each channel, calculating, in the first compression unit, an image representative feature matrix using the representative value of the image feature vector for each channel as each matrix element, and controlling, in the first compression unit, a compressed size of the image feature vector by connecting a fully connected neural network to the image representative feature matrix, calculating, in the first compression unit, the mean value of the image feature vector for each channel through Equation 1 below:

$$f_c = \frac{1}{HW}\sum_{i=1}^{H}\sum_{j=1}^{W}F_{i,j,c} \quad \text{[Equation 1]}$$

where $f_c$: Mean value of an image feature vector of a c-th channel;
H: Height of the image feature vector;
W: Width of the image feature vector; and
$F_{i,j,c}$: Image feature vector value of the c-th channel at (i, j) coordinates.

* * * * *